United States Patent Office 2,714,000
Patented July 26, 1955

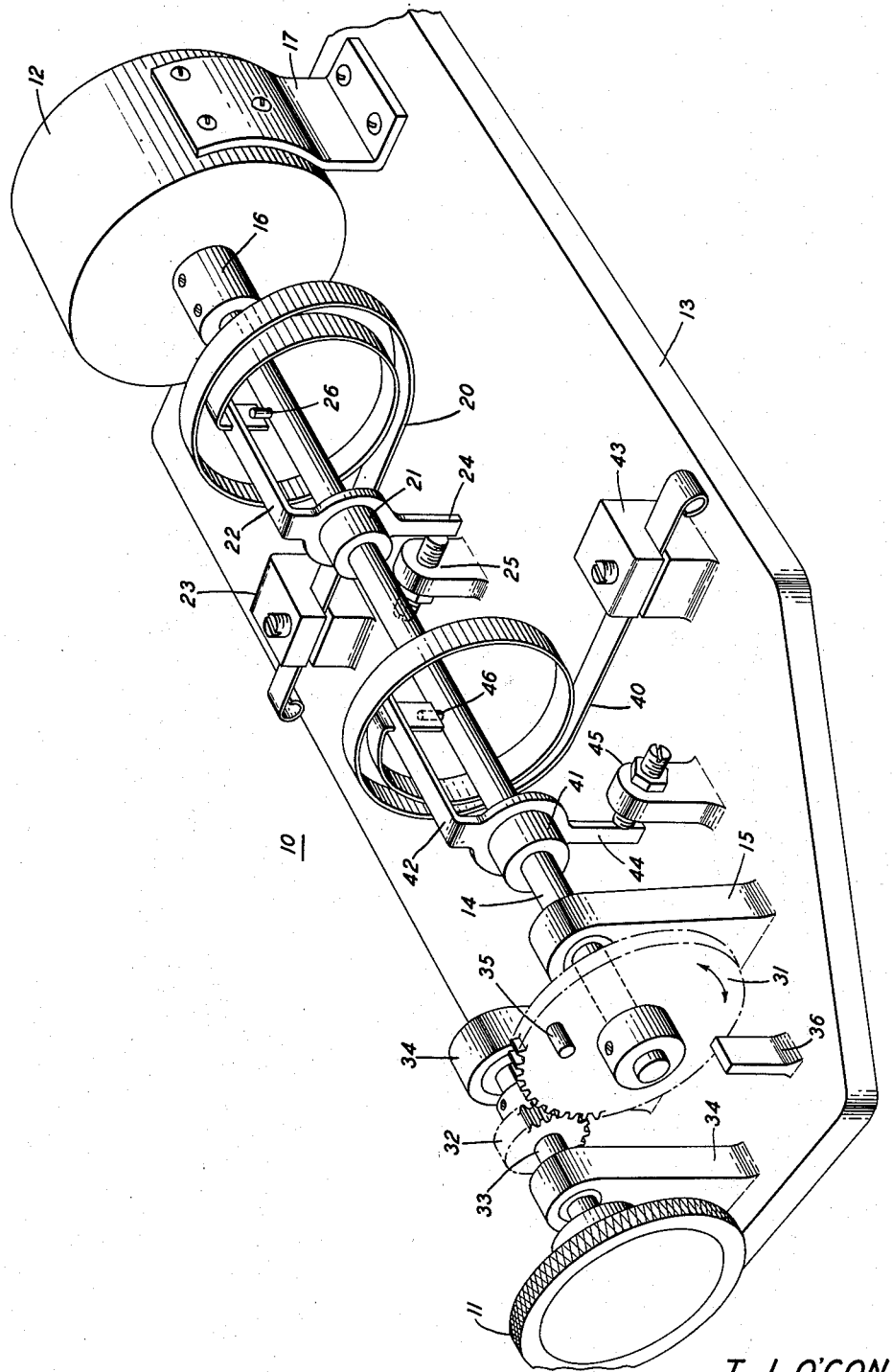

2,714,000
SPRING RETURN MECHANISM

Thomas J. O'Connor, Hanover, and Clayton H. Williams, Dover, N. J., assignors to Bell Telephone Laboratories, Incorporated, New York, N. Y., a corporation of New York Application December 31, 1953, Serial No. 401,599

12 Claims. (Cl. 267—1)

This invention relates to spring actuated devices and more particularly to a mechanism for returning to a central, zero position a deflected instrumentality such as the control element in a potentiometer.

In measuring and calculating devices it is often required that a potentiometer or like device be accurately positioned to correspond to a numerical value. The accuracy of the positioning will in many cases depend upon an exact orientation of the instrument at the zero position.

An object of this invention is to improve the operation of instrumentalities that are required to return to a particular position after deflection in either direction.

A feature of this invention resides in a dual spring mechanism associated with a zero center instrument shaft by one-way clutch means in such a manner that each of two spring elements is capable of rotating the shaft without interference from the other.

Another feature of this invention lies in adjusting means associated with the spring elements whereby extreme accuracy of zero adjustment is obtainable, substantial elimination of back lash is provided, and smooth return travel is assured.

Other and further objects and features of this invention will appear more fully and clearly from the following description of an exemplary embodiment thereof taken in connection with the appended drawing in which the single figure is a perspective representation of an illustrative embodiment of this invention.

The spring mechanism generally designated as 10 is shown as operable by a hand wheel or knob 11 and as connected to operate an instrumentality 12, which may be, for example, a zero center potentiometer. A base or frame 13 serves as a support means for the mechanism 10 and the device 12. The operating shaft 14 is mounted adjacent one end in a bearing 15 and supported at the other end by its connection to the device 12, which may be by means of a coupling 16. The device 12 may be secured to the base by brackets, one of which is shown at 17.

Associated with the shaft 14 are two return springs 20 and 40, which serve respectively to return the shaft and instrumentality to a zero position after a deflection in either direction therefrom. The spring 20 is for a clockwise return and the spring 40 for a counterclockwise return.

The clockwise return spring 20 is adjustably anchored at its outer end to the frame 13 by a clamp 23 and has its inner end secured to a collar 21 freely rotatable upon the shaft 14. The arm 22 on the collar 21 is, as shown, slotted to receive the inner end of the spring 20. The collar 21 has a radially projecting arm 24 which cooperates with an adjustable stop 25 on the base or frame 13. A pin or projection 26 on the shaft 14 is associated with the collar 21 to provide a one-way clutch means, the operation of which will be presently described.

The counterclockwise return spring 40 is associated with a collar 41 by way of a slotted arm 42 and is adjustably anchored to the frame 13 by the clamp 43. The radial arm 44 cooperates with the adjustable stop 45 and the shaft pin 46 with the collar 41. These parts are all reversely operable or reversely positioned counterparts of the corresponding parts associated with the spring 20.

The shaft 14 may be connected to the hand wheel 11 by means of a gear 31 and a drive pinion 32. A drive shaft 33 supported in bearings 34 carries the pinion 32 and the wheel 11. In order to prevent overtravel of the mechanism and the device 12 there is provided a pin 35 on the gear 31 and a stop 36 on the base 13. This limit stop means allows about 180 degrees of rotation of the shaft 14 in either direction from the zero position.

Before describing the operation of this mechanism, it may be noted that in the interest of simplicity of schematic illustration, the inner ends of the springs 20 and 40 have been shown as extending beyond the slots in the arms 22 and 42 into the paths of the pins 26 and 46 respectively. The means cooperating with pins 26 and 46 to provide a one-way clutch could just as well be projections on the arms 22 and 42.

If the knob 11 is rotated to drive the shaft 14 clockwise, the one-way clutch comprising the pin 46 and the collar 41 operates to wind the spring 40. The spring 20 is, however, not affected since the pin 26 moves out of engagement with the inner end of the spring 20. The collar 21 and the inner end of the spring 20 are prevented from following the pin 26 because of the stop 25 in the path of the collar arm 24. When the knob 11 is released the now flexed spring 40 drives the collar 41 and the shaft 14 back to the zero position. This position is exactly determined by the adjustable stop 45 in the path of the collar arm 44.

A counterclockwise rotation of the shaft 14 leads to a similar winding of the spring 20 and subsequent return of the shaft thereby. The spring 40 and its associated collar 41 remain unaffected by this movement because of the one-way clutch arrangement of the pin 46 and said collar 41.

It is believed obvious that a suitable motor drive and clutch means may be used in place of the knob 11. With such means, the clutch may be engaged to deflect the device 12 from zero and may be disengaged to allow the wound spring 20 or 40 to return the mechanism to zero.

The adjustable zero position stops 25 and 45, and the clamps 23 and 43, which provide for adjustment of spring tension, allow for very accurate adjustment of the mechanism at the zero position and for accurate return thereto. For example, the adjustment of the stop 45 should be such that the slightest clockwise movement of the shaft 14 will cause the pin 46 to start winding the spring 40 and the arm 44 to leave the stop 45. The stop 25 should be similarly adjusted. The mechanism should be operated in each direction and the tension of each spring adjusted to insure a uniform and complete return to the zero position from either direction. Such operation will also show whether there is need for further adjustment of the stops 25 and 45 to insure no play or back lash in the mechanism.

The schematic representation in the drawing of a mechanism embodying this invention is but illustrative, and various details may be modified without departing from the spirit and scope thereof.

What is claimed is:

1. A spring return means for re-positioning an instrumentality, which has been positioned to either side of a neutral point under external influence, that comprises a shaft connected to said instrumentality, a frame for mounting the shaft, two collars mounted for free rotation on said shaft; spiral spring means, one associated with each collar with its inner end attached to the collar and its outer end adjustably anchored to the frame, one each of said springs being respectively for clockwise or counterclockwise return of said shaft; driving pins on said shaft for rotation therewith, one associated with each collar and its attached spring to impart clockwise windup to the counterclockwise return spring and counterclockwise windup to the clockwise return spring; a stop arm on each collar and adjustable stop members on the frame, one in the path of each stop arm, and located with respect thereto to prevent rotation of the clockwise return spring and its collar during the windup of the counterclockwise return spring and vice versa.

2. A spring return means for re-positioning an instrumentality which has been positioned to either side of a neutral point under external influence, that comprises a shaft connected to said instrumentality, a frame for mounting the shaft, two collars mounted for free rotation on said shaft; spring means, one associated with each collar with one end attached to the collar and the other end anchored to the frame, one each of said springs being respectively for clockwise or counterclockwise return of said shaft; driving means on said shaft for rotation therewith, one driving means associated with each collar and its attached spring to impart clockwise windup to the counterclockwise return spring and counterclockwise windup to the clockwise return spring; stop means on each collar and adjustable stop members on the frame, one in the path of each stop means, and located with respect thereto to prevent rotation of the clockwise return spring and its collar during the windup of the counterclockwise return spring and vice versa.

3. A dual spring mechanism for returning a deflected instrument to zero position comprising a shaft, operating means and an instrument connected to the shaft, means for rotatably mounting said shaft, two collars on said shaft and rotatable with respect thereto, spring means connected respectively between each collar and the means for mounting the shaft, means on the shaft associated with each collar for rotating the collars respectively in opposite directions and winding the spring connected thereto, each spring, when wound, being capable of rotating the shaft in a reverse direction, and adjustable stop means one associated with each collar, for stopping reverse rotation of the collar at the zero position thereby returning the instrument to zero position from either direction of deflection.

4. A dual spring mechanism for returning a deflected instrument to zero position comprising a shaft, a base, operating means and an instrument connected to the shaft, means for rotatably mounting said shaft on the base, two collars on said shaft and rotatable with respect thereto, spring means connected respectively between each collar and the base, means on the shaft associated with each collar for rotating the collars respectively in opposite directions and winding the spring connected thereto, each spring, when wound, being capable of rotating the shaft in a reverse direction, and stop means on the base, one associated with each collar, for stopping reverse rotation of the collar at the zero position.

5. A dual spring return means comprising a frame, a shaft rotatably mounted on said frame, two collars freely rotatable on said shaft, a spring associated with each collar, means connecting one end of each spring to the associated collar, and adjustable means anchoring the other end of each spring to the frame; stop means on the frame associated with each collar, each stop means lying in the path of a portion of a collar to prevent rotation of each collar beyond a fixed point; connecting means on the shaft associated with each collar and spring, each of said connecting means comprising a projection on the shaft for winding the associated spring upon rotation of the shaft and for reversely rotating the shaft upon unwinding of the spring, the respective windings and collar rotations being in opposite directions.

6. A dual spring return means comprising a frame, a shaft rotatably mounted on said frame, two collars freely rotatable on said shaft, a spring associated with each collar, means connecting each spring to the associated collar, and means anchoring each spring to the frame; stop means on the frame associated with each collar, each stop means lying in the path of a portion of a collar to prevent rotation of each collar beyond a fixed point; connecting means on the shaft associated with each collar and spring, each of said connecting means comprising a projection on the shaft for winding the associated spring upon rotation of the shaft and for reversely rotating the shaft upon unwinding of the spring, the respective windings and collar rotations being in opposite directions.

7. A dual spring mechanism comprising a base, a shaft, means on the base mounting the shaft for rotation, a first collar and a second collar on said shaft each rotatable with respect to the shaft, a first spiral spring and a second spiral spring connected respectively between said collars and anchoring means on said base, said springs being respectively windable in opposite directions, a first projection and a second projection on said shaft respectively adjacent said collars, each projection engageable to rotate the adjacent collar in one direction only to wind the associated spring upon rotation of the shaft, each spring reacting against a respective projection to oppositely rotate said shaft, other means for rotating the shaft, and stop means for limiting the rotation of the shaft in either direction.

8. A dual spring mechanism comprising a base, a shaft, means on the base mounting the shaft for rotation, a first collar and a second collar on said shaft each rotatable with respect to the shaft, a first spring and a second spring connected respectively to said collars and to adjustable anchoring means on said base, said springs being respectively energizable in opposite senses, a first projection and a second projection on said shaft respectively adjacent said collars, each projection engageable to rotate the adjacent collar in one direction only to energize the associated spring upon rotation of the shaft, each spring when energized reacting against a respective projection to oppositely rotate said shaft, other means for rotating the shaft, and stop means for limiting the rotation of the shaft in either direction.

9. A dual spring mechanism comprising a frame, a rotatable shaft mounted on the frame, a collar freely rotatable on the shaft, stop means on the frame in the path of a projection on the collar, a spiral spring adjustably anchored to the frame and connected to said collar, connecting means on the shaft for rotating said collar clockwise for winding said spring and for rotating said shaft counterclockwise under the influence of the wound spring; and corresponding collar, stop, spring, and connecting means similarly associated with the shaft but oppositely connected for like collar and shaft rotation in the opposite sense.

10. A dual spring mechanism comprising a frame, a rotatable shaft mounted on the frame, a collar freely rotatable on the shaft, stop means on the frame in the path of a portion on the collar, a spring adjustably anchored to the frame and connected to said collar, connecting means on the shaft for rotating said collar clockwise for flexing said spring and for rotating said shaft counterclockwise under the influence of the flexed spring; and corresponding collar, stop, spring, and connecting means similarly associated with the shaft but oppositely connected for like collar and shaft rotation in the opposite sense.

11. A dual spring mechanism for returning an instrument to a zero position after deflection in either direction from said position, said mechanism including a rotatable shaft, a frame including means for mounting the shaft, a return spring for each direction of rotation, clamping means adjustably anchoring each spring to said frame, connecting means on the shaft associated with the respective springs for flexing the respective springs each in the opposite sense upon appropriate rotation of the shaft from the zero position and for employing the spring flexure for reversely rotating the shaft to the zero position, each connecting means including a collar freely rotatable on the shaft and connected to one of the springs, and an element on the shaft associated with said collar for rotating the collar in one direction and for being rotated by the collar in the other direction, said connecting means being alternately effective depending upon the direction of shaft rotation; and zero position stop means on the frame engageable with each of said collars, each stop means preventing rotation of its associated collar from the zero position in the direction that the other collar is permitted to rotate.

12. A dual spring mechanism for returning an instrument to a zero position after deflection in either direction from said position, said mechanism including a rotatable shaft, a frame including the shaft, a return spring for each direction of rotation, clamping means anchoring each spring to said frame, connecting means on the shaft associated with the respective springs for tensioning the respective springs each in the opposite sense upon appropriate rotation of the shaft from the zero position and for employing the resulting spring tension for returning the shaft to the zero position, each connecting means including a member freely rotatable on the shaft and connected to one of the springs, and an element on the shaft associated with said member for rotating said member in one direction and for being rotated by the member in the other direction, said connecting means being alternately effective depending upon the direction of shaft rotation; and adjustable zero position stop means on the frame engageable with each of said members, each stop means preventing rotation of its associated member from the zero position in the direction that the other member is permitted to rotate.

References Cited in the file of this patent

UNITED STATES PATENTS

| | | |
|---|---|---|
| 431,124 | Rae | July 1, 1890 |
| 1,043,827 | Hartley | Nov. 12, 1912 |
| 2,143,271 | Jay | Jan. 10, 1939 |

FOREIGN PATENTS

| | | |
|---|---|---|
| 577,489 | Great Britain | May 21, 1946 |